(12) United States Patent
Suurkuusk et al.

(10) Patent No.: US 6,994,467 B2
(45) Date of Patent: Feb. 7, 2006

(54) ABSOLUTE TEMPERATURE MEASURING APPARATUS AND METHOD

(75) Inventors: Jaak Suurkuusk, Järfälla (SE); Niclas Thisell, Stockholm (SE)

(73) Assignee: Thermometric AB, Jarfalla (SE)

( * ) Notice: Subject to any disclaimer, the term of this patent is extended or adjusted under 35 U.S.C. 154(b) by 0 days.

(21) Appl. No.: 10/332,229

(22) PCT Filed: May 29, 2002

(86) PCT No.: PCT/SE02/01035

§ 371 (c)(1),
(2), (4) Date: Aug. 7, 2003

(87) PCT Pub. No.: WO02/097385

PCT Pub. Date: Dec. 5, 2002

(65) Prior Publication Data

US 2004/0052291 A1    Mar. 18, 2004

(30) Foreign Application Priority Data

May 30, 2001  (SE) .................................... 0101882

(51) Int. Cl.
  *G01K 15/00*  (2006.01)
  *G01K 17/00*  (2006.01)
  *G01K 7/00*   (2006.01)
  *G01N 25/00*  (2006.01)

(52) U.S. Cl. .............................. 374/1; 374/10; 374/31; 374/163

(58) Field of Classification Search .................. 374/1, 374/3, 10, 11, 12, 13, 33, 179, 163, 31; 702/99, 702/130
See application file for complete search history.

(56) References Cited

U.S. PATENT DOCUMENTS

| | | | | |
|---|---|---|---|---|
| 5,288,147 A | * | 2/1994 | Schaefer et al. | 347/10 |
| 5,779,362 A | * | 7/1998 | Lightfoot | 374/33 |
| 6,318,890 B1 | * | 11/2001 | Hutter et al. | 374/10 |
| 6,485,173 B2 | * | 11/2002 | Plotnikov et al. | 374/10 |
| 6,497,509 B2 | * | 12/2002 | Merzliakov et al. | 374/10 |
| 6,641,300 B1 | * | 11/2003 | Lacey et al. | 374/1 |
| 6,648,504 B2 | * | 11/2003 | Danley | 374/10 |

FOREIGN PATENT DOCUMENTS

| | | |
|---|---|---|
| DE | 3700466 | 7/1988 |
| JP | 7245425 | 5/1995 |
| JP | 9152379 | 6/1997 |
| SE | 86022654 | 12/1987 |
| SU | 614339 | 5/1978 |
| SU | 1739211 | 6/1992 |
| WO | 8707372 | 12/1987 |

* cited by examiner

*Primary Examiner*—Gail Verbitsky
*Assistant Examiner*—Mirellys Jagan
(74) *Attorney, Agent, or Firm*—Harness, Dickey & Pierce

(57) ABSTRACT

This invention relates to a method for determining the absolute temperature of a substance, comprising the steps of: sensing the absolute temperature of the substance and generating an absolute value associated therewith; sensing a temperature difference between the temperature of a reference body and the temperature of the substance and generating a difference value associated therewith; determining an optimised value of the absolute temperature of the substance by means of said absolute value and said difference value. The invention also relates to an apparatus for performing the method; a temperature control system for controlling the temperature of a substance; and an instrument comprising a substance, and such a temperature control system.

19 Claims, 3 Drawing Sheets

ABSOLUTE TEMPERATURE MEASURING APPARATUS AND METHOD

TECHNICAL FIELD

The present invention relates to a method for measuring absolute temperature, an apparatus for performing the method, and a control system and an instrument respectively, which uses the apparatus and the method.

TECHNICAL BACKGROUND

There are many different purposes of measuring the absolute temperature. Within a particular sub-area of this technical field there is a need for performing the measurement at a very high resolution. A resolution of a ten thousandth of a degree Celsius or better is required in many applications. The present invention relates to such high resolution measurements. One example thereof is absolute temperature measurements in calorimetry. When executing calorimetric measurements and other measurements demanding high accuracy measurement and control of the temperature, there exist different problems associated with various circumstances of measurement. In cases where a rather wide range of temperatures is scanned it is necessary that the measurement apparatus provides for a large continuous dynamic range.

Swedish patent No. 8602265-4, to Jaak Suurkuusk, discloses an apparatus for measuring the absolute temperature of a measurement body at a high resolution. This prior art apparatus is capable of providing a high resolution over a wide range, and it works well for temperature scanning applications. The resolution is at least $10^{-5}$K. The good performance of the Suurkuusk apparatus is obtained primarily due to an employment of a relative temperature measurement between the measurement body and a reference body. By obtaining knowledge of an initial absolute temperature of the measurement body, the following relative temperature measurements during the scanning provides for the high resolution estimate of the absolute temperature of the measurement body. Unfortunately this prior art method has proven not to be optimised for isothermal conditions, such as, for example, in a calorimeter wherein the temperature of a liquid is to be kept at a constant temperature over several days or more. The same applies for slow scannings. The problem is a minor offset caused by non-ideal amplifier electronics. The offset causes a drift of the measured temperature.

However, for isothermal applications typically a direct absolute temperature measuring thermometer, such as a resistance thermometer, for example a platinum resistance thermometer or a quarts thermometer, has been used. Those thermometers are good as regards long term stability. However, a problem of those known thermometers measuring the absolute temperature directly is a limited resolution, at the best about $10^{-5}$K, which for many possible applications is not good enough.

SUMMARY OF THE INVENTION

It is an object of the present invention to provide a method and a device for measuring absolute temperature, for obtaining a good long term stability so as to enable high resolution measurements at isothermal and near isothermal conditions, and for obtaining a dynamic range in parity with the one over which measurements are to be executed.

In accordance with one aspect of the invention there is provided a method for determining the absolute temperature of a substance, by which method said object is obtained. The method contains the steps of:
  sensing the absolute temperature of the substance and generating an absolute value associated therewith;
  sensing a temperature difference between the temperature of a reference body and the temperature of the substance and generating a difference value associated therewith;
  determining an optimised value of the absolute temperature of the substance by means of said absolute value and said difference value.

In accordance with another aspect of the invention there is provided an apparatus for determining the absolute temperature of a substance, by which apparatus said object is obtained. The apparatus comprises:
  an absolute temperature sensor, which is arranged to sense an absolute temperature of the substance and generate an absolute value associated therewith;
  a difference temperature sensor comprising a reference body and a difference temperature sensing means, which is attached to said reference body, and which is arranged to sense a temperature difference between the substance and the reference body, wherein said difference temperature sensor is arranged to generate a difference value associated with said temperature difference;
  a processing unit connected to said absolute temperature sensor and to said difference temperature sensor for receiving the absolute value and the difference value respectively, wherein the processing unit is arranged to determine an optimised value of the absolute temperature of the substance by means of said absolute value and said difference value.

Consequently, the basic idea of the invention is to use the principles of relative temperature measurement set forth in the Suurkuusk patent and combine them with an absolute temperature measurement. This combination enables a detection and elimination, or at least substantial reduction, of the offset problem described above. In accordance with the invention the best performance of the absolute temperature sensor are joined with the best performance of the relative temperature sensor in order to determine an optimised value of the absolute temperature.

The relative measurement, i.e. the sensing of a temperature difference between the reference body and the substance is performed either directly or indirectly via a measurement body, which, in turn, is thermally connected with the substance, such that it adopts substantially the same temperature as the substance. This means that the choice of material of the measurement body and the connection thereof to the substance are performed in a way that provides for a high heat exchange between the measurement body and the substance. The embodiment of indirect sensing is preferably used when the substance is a liquid, while a direct sensing preferably is used in conjunction with solid state substances.

BRIEF DESCRIPTION OF THE DRAWINGS

Further object and advantages of the present invention will be evident from the following description of exemplifying embodiments, which will be explained with reference to the accompanying drawings, in which.

DESCRIPTION OF EMBODIMENTS

Figure 1:
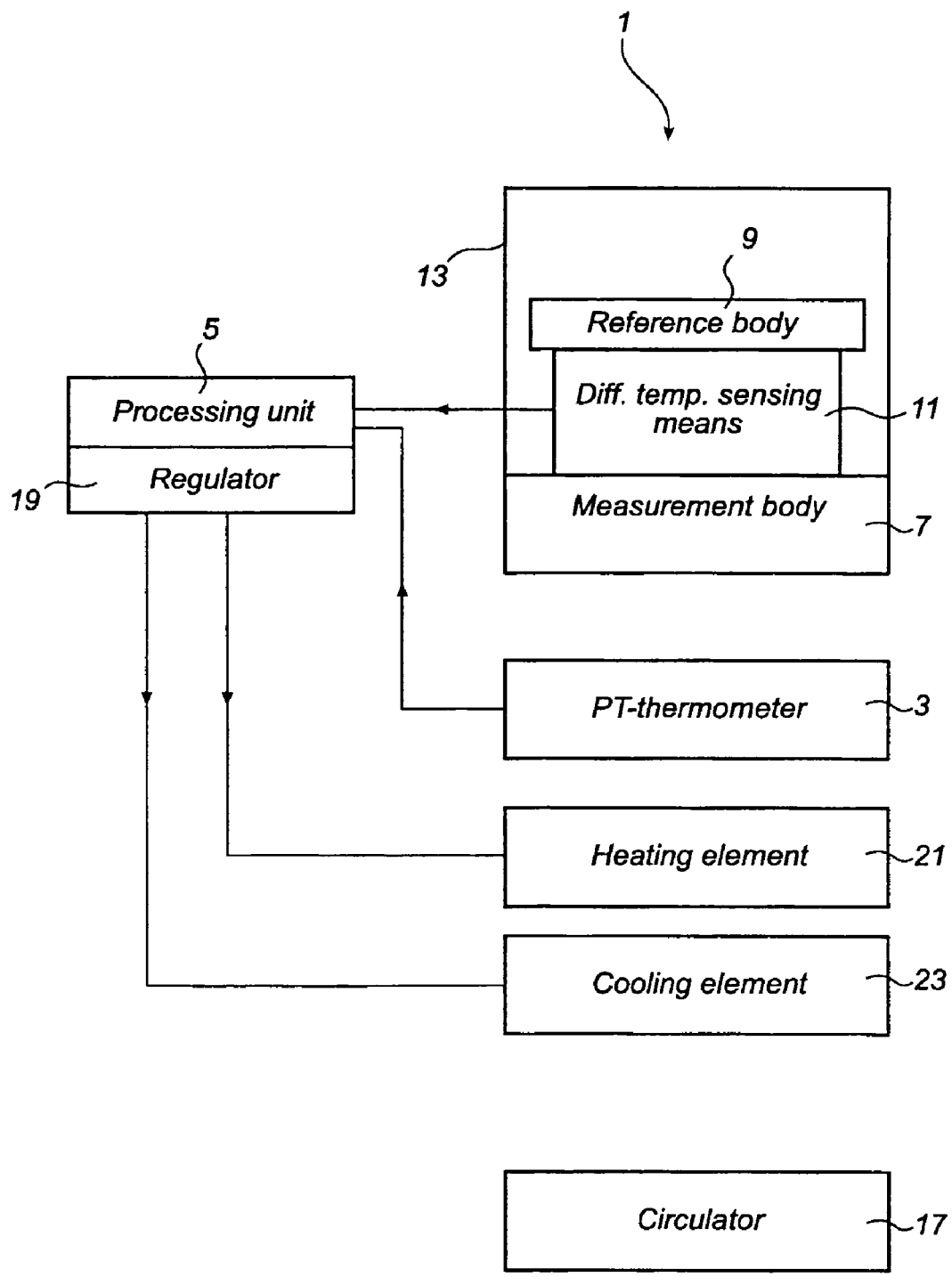
FIG. 1 shows a schematic block diagram of an embodiment of the temperature control system according to the present invention, which system comprises an embodiment of the apparatus according to the present invention.
Figure 2:
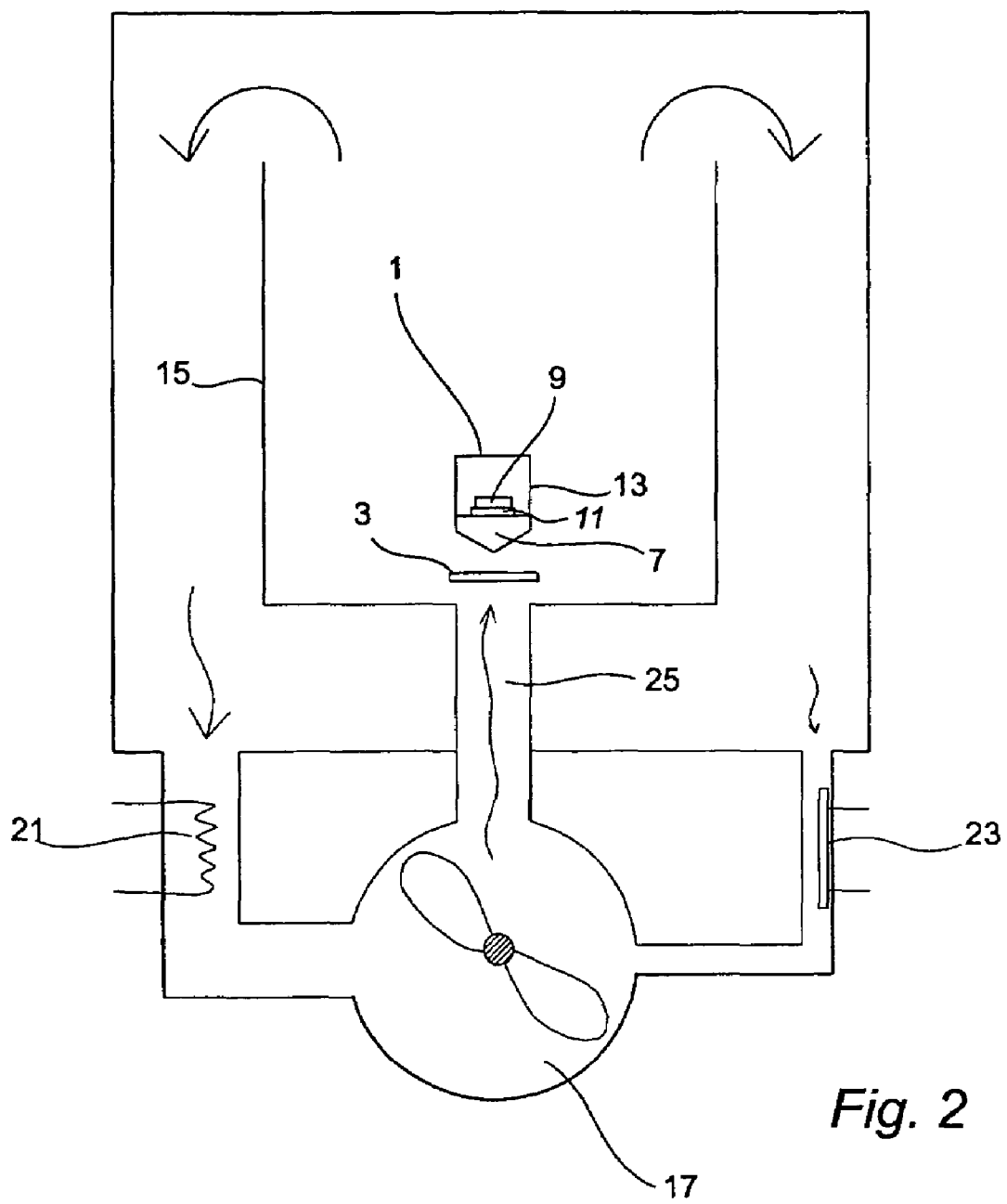
FIG. 2 shows a scematic perpective view of the control system of FIG. 1.

As shown in FIGS. 1 and 2, a first embodiment of the apparatus according to the present invention comprises a relative temperature sensor 1, an absolute temperature sensor 3, and a processing unit 5, which is connected to both sensors 1, 3. In an exemplary embodiment, the absolute temperature sensor 3 may be a platinum resistance thermometer, which will be referred to as a PT-thermometer. The PT-thermometer 3 is preferred due to its good performance as to long term stability, which will be further explained below. However, it should be appreciated that the absolute temperature sensor may be other thermometers, such as, but not limited to, a metallic resistance thermometer, a semiconductor resistance thermometer, a thermoelement thermometer, a frequency-based thermometer, and/or an emission thermometer. In the following, the relative temperature sensor 1 will be referred to as an RT-sensor.

The RT-sensor 1 comprises a measurement body 7, a reference body 9 and a difference temperature sensing means 11, which is thermally, and, here, in fact physically, connected to both the measurement body 7 and the reference body 9, and which senses a temperature difference between the reference body 9 and the measurement body 7. Preferably the difference temperature sensing means comprises a plurality of thermoelements (thermo-piles), which are attached to each other forming a block, and which are engaged with a respective surface area of each one of the bodies 7, 9. Further, the RT-sensor 1 comprises a housing 13. The housing 13 embraces said bodies 7, 9 and said sensing means 11, and it is attached with the measurement body 7 and is heat conducting. Thus, the measurement body 7 is exposed to the surrounding environment, or substance, as regards the heat thereof. More specifically, it is arranged so that the measurement body and the substance have the same temperature within the measurement precision. Further the housing 13 is not engaged with the reference body 9, but rather it forms a cavity wherein the reference body 9 is arranged at a distance from the inner wall of the housing 13 and, thus, the reference body 9 is substantially heat insulated from the substance 25.

As shown most schematically in FIG. 2, which substantially is a cross-sectional view, the sensors 1, 3 are arranged in a tube 15 through which the substance 25, which in this embodiment is a liquid, is flowing, driven by a circulation device 17. Thus, the sensors 1, 3 are arranged in a bath, which is a typical application of the invention. In this embodiment there is a requirement in that the heat exchange between the measurement body 7 and the bath 25 is very high so that the temperature of the measurement body 7 accurately enough follows that of the bath 25.

Figure 3:
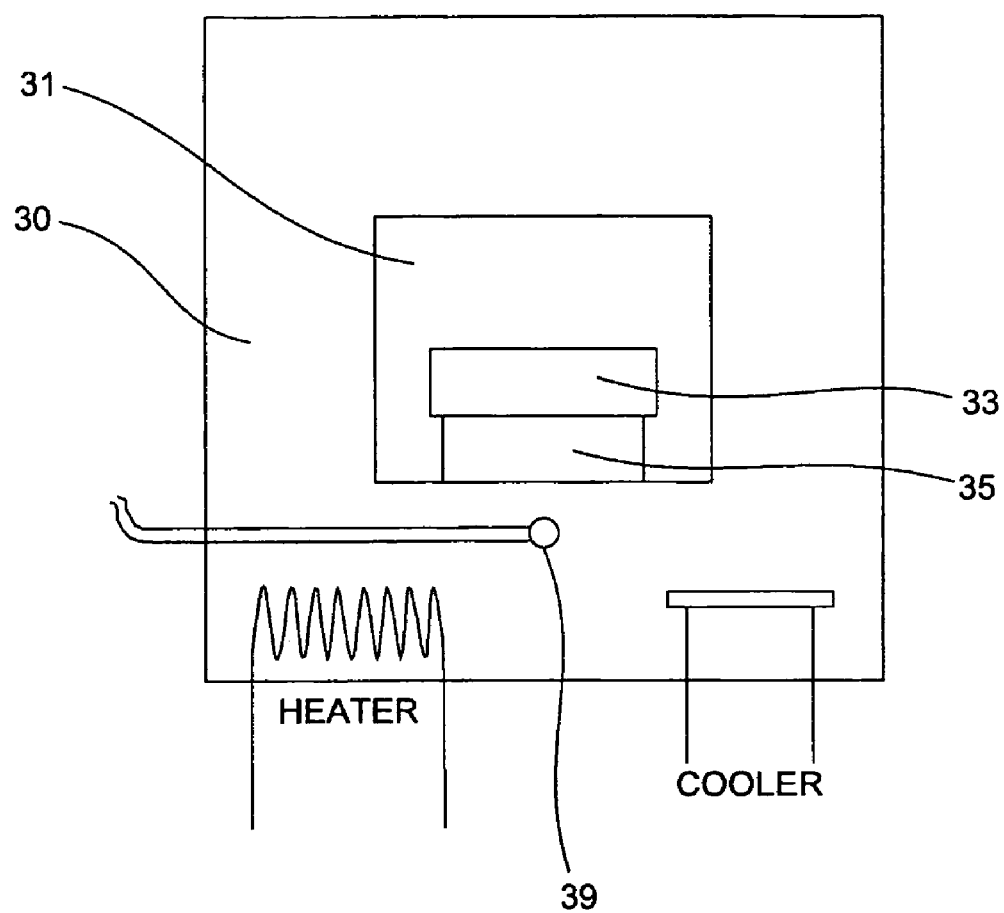
FIG. 3 shows a cross-sectional view of another embodiment of the apparatus according to the present invention.

With reference to FIG. 3 a second embodiment of the apparatus comprises a difference temperature sensor 31, an absolute temperature sensor 39 and a processing unit (not shown). The difference temperature sensor 31 comprises a reference body 33, and a difference temperature sensing means 35. This second embodiment is adapted to cases where the substance is a solid body 30. Thus, the measurement body, which was used above as an intermediate means for enabling a high resolution relative measurement where the substance is a liquid, is no longer necessary. In another view the substance 30 itself can be considered as embodying the measurement body.

In the second embodiment the reference body 33 is attached to the temperature sensing means 35, which in turn is attached to the solid body 30. There is no separate housing, but rather the reference body 33 and the temperature sensing means 35 are arranged in a cavity of the solid body 30. Thus, in another view, the solid body 30 can be regarded as defining a housing. The reference body 33 is merely in physical contact with the temperature sensing means 35 and is substantially thermally isolated from the solid body 30. The absolute temperature sensor 39 is attached to the solid body 30. Like in the first embodiment the sensors 31, 39 are connected to the processing unit.

In FIGS. 1 and 2 further an embodiment of a temperature control system according to this invention is shown. The control system comprises the first embodiment of the apparatus as well as the circulation device described above. Additionally, the temperature control system comprises a regulator 19, which is connected to said apparatus, and heating and cooling elements 21, 23 respectively which are connected to the regulator 19, and which are arranged in the bath 25. The regulator 19 is connected to the processing unit 5. It is to be noted that the temperature control system could be constructed on basis of the second embodiment of the apparatus as well.

In an embodiment of a method employing the apparatus of the present invention, a difference value is generated by means of the RT-sensor 1, 31, which senses the relative temperature between the reference body 9, 33 and the substance, either indirectly, such as via the measurement body 7 in the first embodiment, or directly, such as in the second embodiment. That is, the difference temperature sensing means 11 senses the temperature difference between the two bodies 7 and 9 or 30 and 33. The RT-sensor 1, 31 then generates a relative value associated with the temperature difference and feeds it to the processing unit 5. In the disclosed embodiments the difference value is a voltage signal, which is generated by the thermo-piles of the difference temperature sensing means 11, and which below will be referred to as the first voltage signal. Further, the absolute temperature of the substance 25, 30 is sensed and an absolute value, which is associated therewith, is generated by means of the PT-thermometer 3, 39. The absolute value too is a voltage signal, which will be referred to as the second voltage signal.

When controlling, by means of said temperature control system, the temperature of the substance 25, 30 the absolute and difference values are both used so as to obtain a high resolution absolute temperature value of the bath. For many applications the resolution of the PT-thermometer alone is not good enough. This is because the voltage signal provided by the PT-thermometer is rather noisy. On the other hand, as discussed above, the resolution of the RT-sensor 1, 31 is good, while the long term stability of the first voltage signal is not good enough for isothermal and near isothermal conditions.

The absolute value and the difference value are generated continuously over time. The processing unit 5 receives the first and second voltage signals and determines an absolute temperature of the substance 25, 30 while using both values. In the shown application a temperature signal representing the determined absolute temperature is fed to the regulator 19, which in turn uses the temperature signal to regulate the temperature of the substance 25, 30. For example the regulator 19 can be a PID regulator.

According to the present embodiment of the method the determination of the absolute temperature is performed as follows. In the equations below, for reasons of simplicity, the integrals are merely schematically indicated as to the range. However, it is to be noted that each integral covers a time interval from 0 to t. The basis for the determination of the absolute temperature is a model in accordance with:

$$T = T_0 + g V_{diffnom} + \int \frac{g}{\tau} V_{diffnom} \qquad (\text{eqn 1})$$

where $T_0$ is the initial absolute temperature of the bath at the beginning of a run, $V_{diffnom}$ is the nominal difference value, g is a transformation factor for, when necessary, transforming the difference value into temperature, and $\tau$ is a time constant for heat transmission between said measurement body 7 and said reference body 9, or between the reference body 30 and the measurement body 33, i.e. the solid substance. In the present embodiment the difference value is a voltage. Thus a transformation into temperature is needed, why g=1/s, where s is the so called Seebeck coefficient. In practice, as explained above, the difference value received from the RT-sensor 1 is subject to a minor error due to an offset voltage $\delta V_{diff}$. The offset voltage becomes a problem under certain circumstances, such as in isothermal conditions, i.e. when the temperature of the bath should be kept constant over a time period, or in conditions of a slowly changing temperature, such as when performing a slow scanning where the temperature is changed for example a few degrees or even parts of a degree per hour. Thus, the sensed difference voltage $V_{diff} = V_{diffnom} + \delta V_{diff}$, resulting in a rewritten equation 1 of:

$$T = T_0 + \frac{1}{s}(V_{diff} - \delta V_{diff}) + \int \frac{1}{s\tau}(V_{diff} - \delta V_{diff}) \qquad (\text{eqn 2})$$

$\delta V_{diff}$ is assumed to vary sufficiently slowly not to cause a significant error when brought outside of the integral.

$$T_{approx} = T_0 + \frac{1}{s} V_{diff} - \frac{\delta V_{diff}}{s} + \int \frac{1}{s\tau} V_{diff} - \delta V_{diff} \int \frac{1}{s\tau} \qquad (\text{eqn 3})$$

The sensed absolute value, i.e. the second voltage signal, is transformed into a temperature $T_{PT}$, which is equated to $T_{det}$ in the least square error sense. Then the known terms are gathered on the right hand side:

$$T_0 - \frac{\delta V_{diff}}{s} - \delta V_{diff} \int \frac{1}{s\tau} = T_{PT} - \frac{1}{s} V_{diff} - \int \frac{1}{s\tau} V_{diff} \qquad (\text{eqn 4})$$

With negligable error, we can group the first two terms to a constant $$C_1 = T_0 - \frac{\delta V_{diff}}{s}$$

and define a second constant $C_2 = -\delta V_{diff}$ to get $$C_1 + C_2 \int \frac{1}{s\tau} = T_{PT} - \frac{1}{s} V_{diff} - \int \frac{1}{s\tau} V_{diff} \qquad (\text{eqn 5})$$

Next a least squares fit is employed for obtaining $C_1$, and $C_2$, by means of which $T_0$ and $\delta V_{diff}$ can be calculated using the definition of said constants.

The least squares fit is performed in a conventional way by setting up a matrix and a vector and solving the linear equation system thus obtained for each sample for providing a value of $T_{det}$. Using an orthodox least square error method would work nicely, except for the fact that $\delta V_{diff}$ does vary, though slowly. It would eventually settle on an average $\delta V_{diff}$, but be wrong most of the time. This problem is overcome by continuously scaling down the matrix and vector, thus assigning lower weight to past data-samples and higher weight to recent ones. More specifically, the matrix and the vector are multiplied by $e^{-\Delta t/\alpha}$, where $\alpha$ becomes a time constant of the coupling to the absolute temperature sensor. This could be expressed by:

$$A_{i+1} = A_i e^{-\frac{\Delta t}{\alpha}} + \begin{bmatrix} 1 & \int \frac{1}{s\tau} \\ \int \frac{1}{s\tau} & \left(\int \frac{1}{s\tau}\right)^2 \end{bmatrix} \left(1 - e^{-\frac{\Delta t}{\alpha}}\right) \qquad (\text{eqn 6})$$

$$b_{i+1} = b_i e^{-\frac{\Delta t}{\alpha}} + \begin{bmatrix} 1 \\ \int \frac{1}{s\tau} \end{bmatrix} \left(T_{PT} - \frac{1}{s} V_{diff} - \int \frac{1}{s\tau} V_{diff}\right) \left(1 - e^{-\frac{\Delta t}{\alpha}}\right) \qquad (\text{eqn 7})$$

$$(C_\alpha)_i = (A_i^{-1} b_i)_\alpha \quad \text{and} \qquad (\text{eqn 8})$$

$$(T_{det})_i = (C_1)_i + (C_2)_i \int \frac{1}{s\tau} + \frac{1}{s} V_{diff} + \int \frac{1}{s\tau} V_{diff} \qquad (\text{eqn 9})$$

Finally, the absolute temperature is determined by equation 9, whereby a value of higher resolution than the initially sensed absolute temperature value has been obtained. In a sense, the value of the absolute temperature as sensed by means of the PT-sensor has been optimised by means of the difference value. It is to be noted that, as understood by the man skilled in the art, the integrals are in fact best calculated as sums on basis of sampled values of the sensed absolute and difference temperatures.

As can be seen from above, the second voltage signal is used for detecting a trend that occurs erroneously in the first voltage signal. The fact that the second voltage signal is stable over time, though noisy, and the first voltage signal is a low noise signal, though not fully stable over time, is used as described above in order to obtain a highly reliable high resolution value of the absolute temperature at a given point of time.

Above advantageous embodiments of the present invention have been described. These should be seen as merely non-limiting examples. Many modifications will be possible within the scope of the invention as defined by the claims.

What is claimed is:

1. A method for determining the absolute temperature of a substance, comprising the steps of repeatedly:

sensing the absolute temperature of the substance and generating an absolute value associated therewith;

sensing a temperature difference between a temperature of a reference body and a temperature of the substance and generating a difference value associated therewith; and determining an optimised value of the absolute temperature of the substance by means of said absolute value and said difference value, wherein said determining the optimised value further comprising:

establishing a mathematical expression for a determined absolute temperature $T_{det}$ at a time t, where $T_{det}$ is determined by means of said difference value;

providing a sensed absolute temperature $T_{PT}$ at the time t by means of said absolute value;

establishing an equation by setting the determined absolute temperature $T_{det}$ expressed by said mathematical expression equal to the sensed absolute temperature $T_{PT}$;

providing said equation with relevant values of said sensed absolute temperature and said difference value;

iteratively determining unknown factors of the equation; and solving the equation for quantities, including the determined absolute temperature $T_{det}$, represented in said factors.

2. A method as claimed in claim 1, wherein said step of sensing a temperature difference further comprises:

arranging a measurement body in thermal contact with the substance such that it adopts substantially the same temperature as the substance; and sensing said temperature difference as a temperature difference between the reference body and the measurement body.

3. A method as claimed in claim 1, said step of iteratively determining constituting a least squares error fit.

4. A method as claimed in claim 1, wherein the difference value $V_{diff}$ is equal to $V_{diffnom} + \delta V_{diff}$, where $V_{diffnom}$ is a nominal difference value and $\delta V_{diff}$ is an offset thereof, and wherein said mathematical expression is based on:

$$T_{det} = T_0 + g(V_{diff} - \delta V_{diff}) + \int_0^t g\frac{1}{\tau}(V_{diff} - \delta V_{diff})dt$$

where $T_0$ is the absolute temperature of the substance at time 0, g is a transformation factor for, when necessary, transforming the difference value into temperature, and $\tau$ is a time constant.

5. A method as claimed in claim 4, wherein said equation is represented as:

$$C_1 + C_2 \int_0^t \frac{1}{s\tau} = T_{PT} - gV_{diff} - \int_0^t g\frac{1}{\tau}V_{diff}$$

where $C_1 = T_0 - g\delta V_{diff}$ and $C_2 = -\delta V_{diff}$, and wherein $C_1$ and $C_2$ being said unknown factors, said quantities include said offset.

6. A method as claimed in claim 4, wherein $V_{diff}$ is a voltage.

7. An apparatus for determining the absolute temperature of a substance, comprising:

an absolute temperature sensor, which is arranged to repeatedly sense an absolute temperature of the substance and generate an absolute value associated therewith;

a difference temperature sensor including a reference body and a difference temperature sensing means, which is attached to said reference body, and which is arranged to repeatedly sense a temperature difference between the substance and the reference body, said difference temperature sensor is arranged to generate a difference value associated with said temperature difference;

a processing unit connected to said absolute temperature sensor and to said difference temperature sensor for receiving the absolute value and the difference value respectively, the processing unit is arranged to repeatedly determine an optimised value of the absolute temperature of the substance by means of said absolute value and said difference value, wherein said substance is a liquid, said difference temperature sensor further includes a measurement body, which is attached to said difference temperature sensing means, and which is arranged to be put into contact with said liquid and to adopt substantially the same temperature as the liquid, and said absolute temperature sensor is arranged to be put into contact with said liquid.

8. An apparatus as claimed in claim 7 wherein said substance is a solid body, and wherein said absolute temperature sensor as well as said difference temperature sensing means is arranged to be attached to said solid body.

9. An apparatus as claimed claim 7 wherein said difference temperature sensing means senses a heat transfer to/from said reference body.

10. An apparatus as claimed in claim 7 wherein said temperature sensing means comprises thermopiles.

11. An apparatus as claimed in claim 7 wherein said absolute temperature sensor comprises a thermometer which is one of a group consisting of metallic resistance thermometers, semi conductor resistance thermometers, thermoelement thermometers, frequency based thermometers and emission thermometers.

12. An apparatus as claimed in claim 7, comprising a circulating means for generating a flow of the liquid passed said sensors.

13. An apparatus as claimed in claim 12, wherein said absolute temperature sensor is arranged upstream of said difference temperature sensor.

14. An apparatus as claimed in claim 7, wherein said processing unit comprises a device that determines said optimised value of the absolute temperature on basis of equation:

$$T_{det} = T_0 + g(V_{diff} - \delta V_{diff}) + \int_0^t g\frac{1}{\tau}(V_{diff} - \delta V_{diff})dt$$

where $T_{det}$ is the determined temperature; where $V_{diff}$ is said difference value and $V_{diff} = V_{diffnom} + \delta V_{diff}$, $V_{diffnom}$ being the nominal difference value and $\delta V_{diff}$ being an offset thereof; where $T_0$ is the absolute temperature of the substance at time 0; where g is a transformation factor for, when necessary, transforming the difference value into temperature; and where $\tau$ is a time constant.

15. An apparatus as claimed in claim 14 wherein said processing unit is arranged to establish an equation including a sensed absolute temperature $T_{PT}$, which is determined by means of said absolute value, by setting the determined absolute temperature $T_{det}$ equal to the sensed absolute temperature $T_{PT}$, said equation being represented as:

$$C_0 + C_1 \int_0^t \frac{1}{s\tau} = T_{PT} - gV_{diff} - \int_0^t g\frac{1}{\tau}V_{diff}$$

where $C_0 = T_0 - g\delta V_{diff}$ and $C_1 = -\delta V_{diff}$, and wherein said processing unit is arranged to iteratively determine $C_0$ and $C_1$ and solve the equation for the determined absolute temperature $T_{det}$.

16. A temperature control system for controlling the temperature of a substance, comprising: an apparatus for determining the absolute temperature of the substance according to claim 7 a regulator, which is connected to said apparatus; and heating and cooling elements respectively, which are connected to the regulator, and which are arranged to heat and cool respectively the substance.

17. An instrument comprising a substance, and a temperature control system according to claim 16 for controlling the temperature of said substance.

18. An instrument as claimed in claim 17, wherein said substance is a solid body.

19. An instrument as claimed in claim 17, wherein said substance is a liquid, and wherein said difference temperature sensor further comprises a measurement body, which is attached to said difference temperature sensing means, and arranged in contact with said liquid, and said absolute temperature sensor is arranged in contact with said liquid.

* * * * *